(No Model.) 5 Sheets—Sheet 1.

P. CLIFFORD & J. COUPAL.
BOOT OR SHOE NAILING MACHINE.

No. 440,394. Patented Nov. 11, 1890.

Witnesses
Irving H. Fay.
A. D. Harris

Inventors
P. Clifford
J. Coupal
By their Attorneys (No Model.) 5 Sheets—Sheet 3.

P. CLIFFORD & J. COUPAL.
BOOT OR SHOE NAILING MACHINE.

No. 440,394. Patented Nov. 11, 1890.

Witnesses
Irving H. Fay.
A. D. Harrison

Inventors
P. Clifford
J. Coupal

By their Attorneys

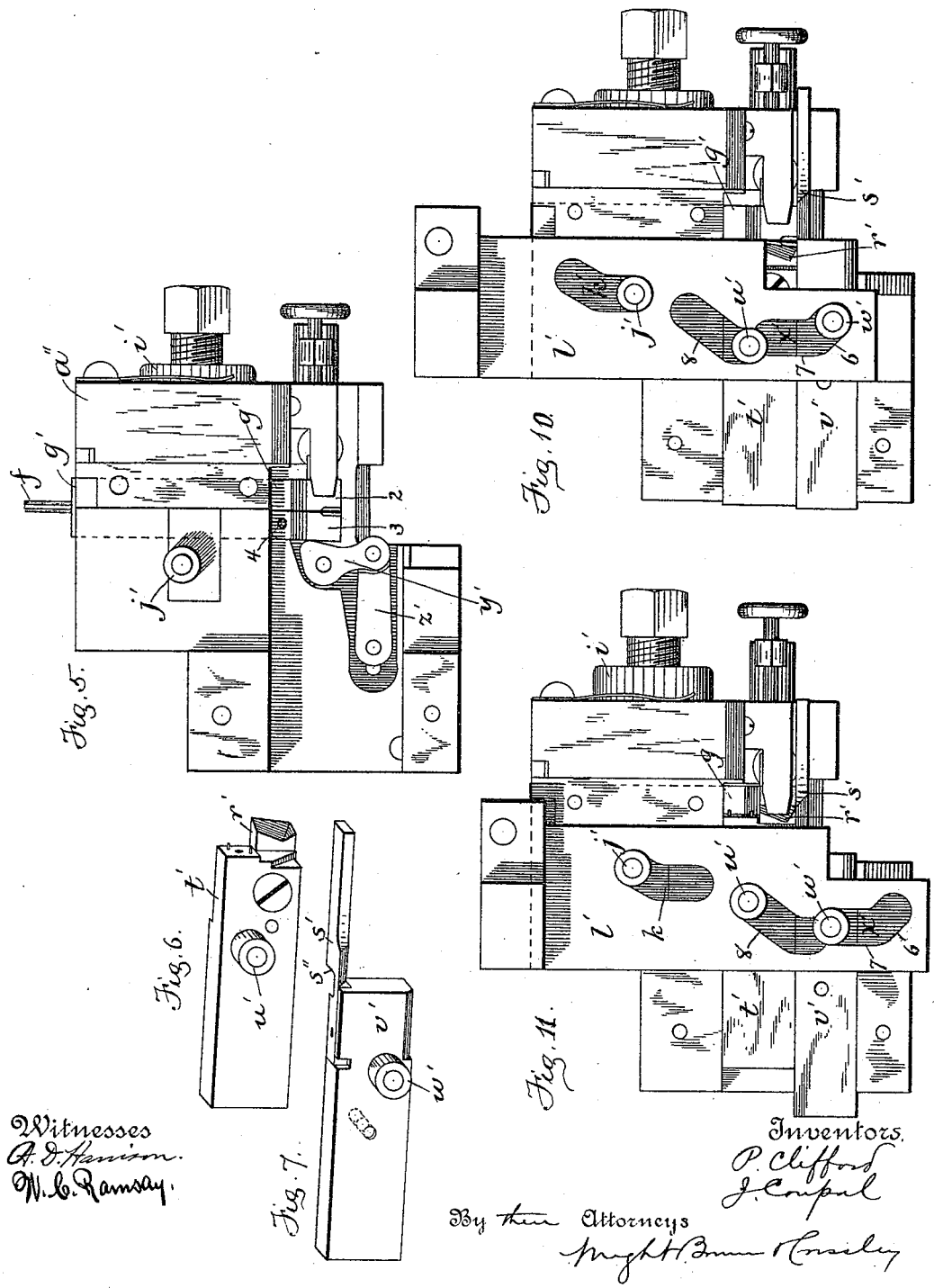

(No Model.) 5 Sheets—Sheet 5.
P. CLIFFORD & J. COUPAL.
BOOT OR SHOE NAILING MACHINE.
No. 440,394. Patented Nov. 11, 1890.
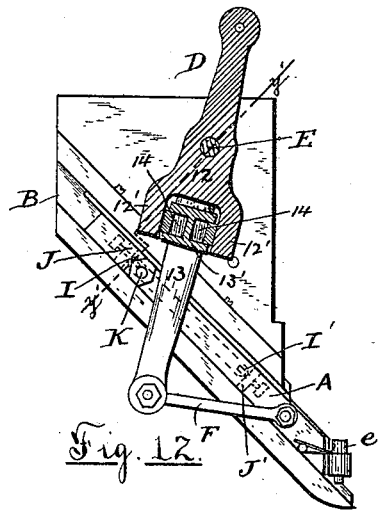

UNITED STATES PATENT OFFICE.

PATRICK CLIFFORD, OF QUINCY, AND JOSEPH COUPAL, OF BOSTON, MASSACHUSETTS.

BOOT OR SHOE NAILING MACHINE.

SPECIFICATION forming part of Letters Patent No. 440,394, dated November 11, 1890.

Application filed October 17, 1889. Serial No. 327,343. (No model.)

*To all whom it may concern:*

Be it known that we, PATRICK CLIFFORD and JOSEPH COUPAL, respectively of Quincy, in the county of Norfolk, and of Boston, in the county of Suffolk, both in the State of Massachusetts, have invented certain new and useful Improvements in Boot or Shoe Sole Nailing Machines, of which the following is a specification.

This invention has for its object to provide a simple and effective nailing-machine adapted to form nails from the improved wire described in Patent No. 393,885, granted to us December 4, 1888, and to drive the same into a boot or shoe.

The invention consists in the several improvements which we will now proceed to describe and claim.

Figures 1, 8:
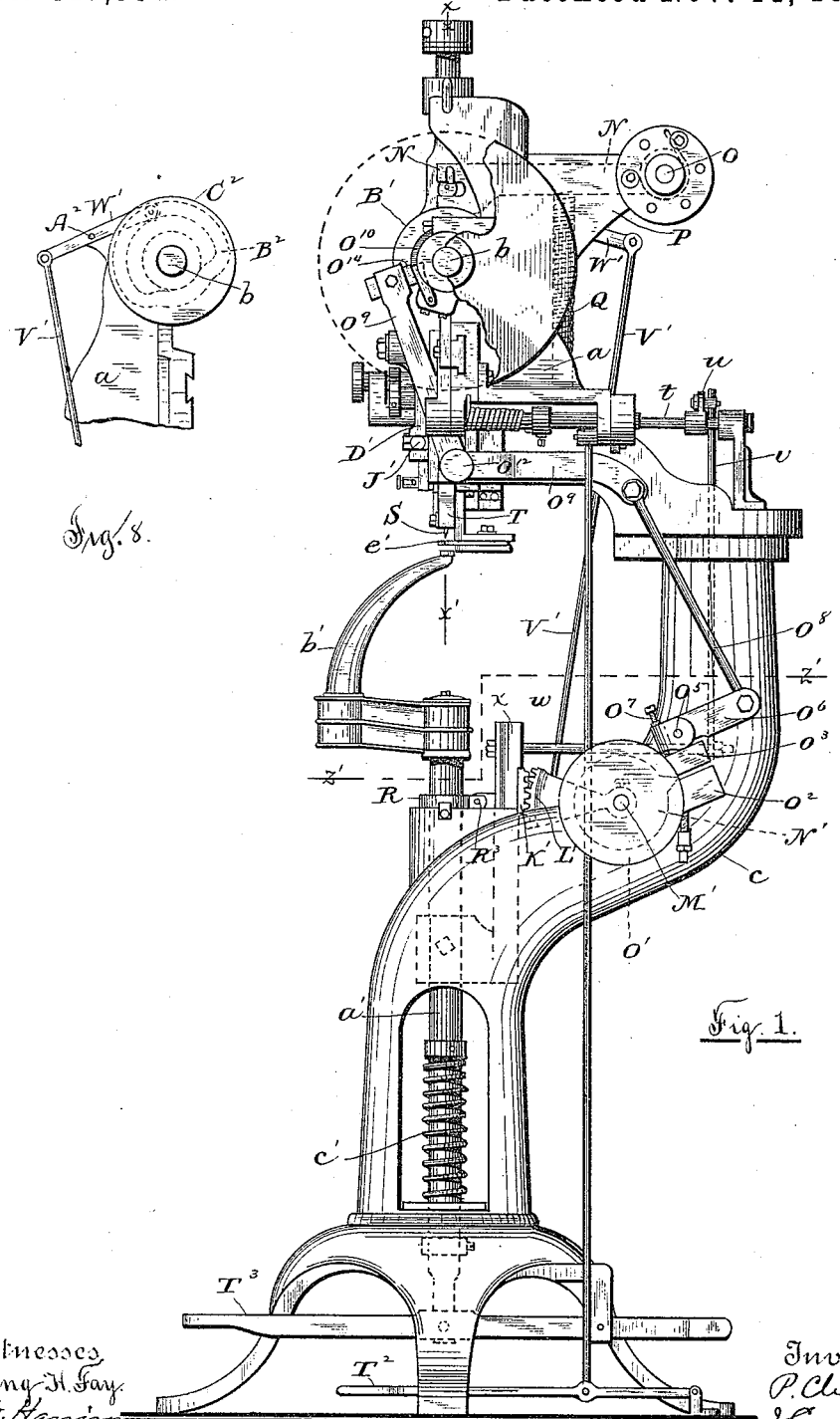
Figure 2:
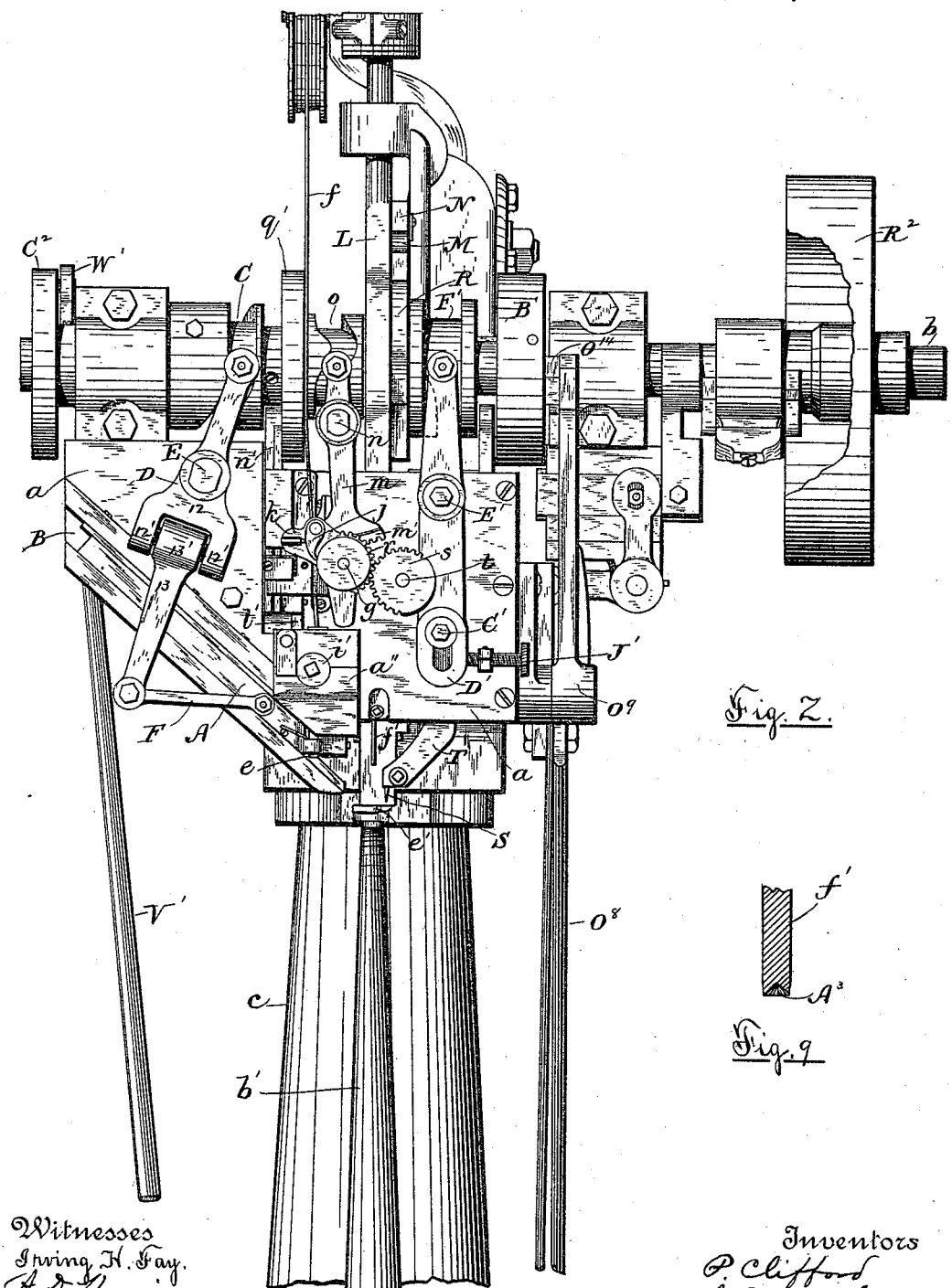
Figure 3:
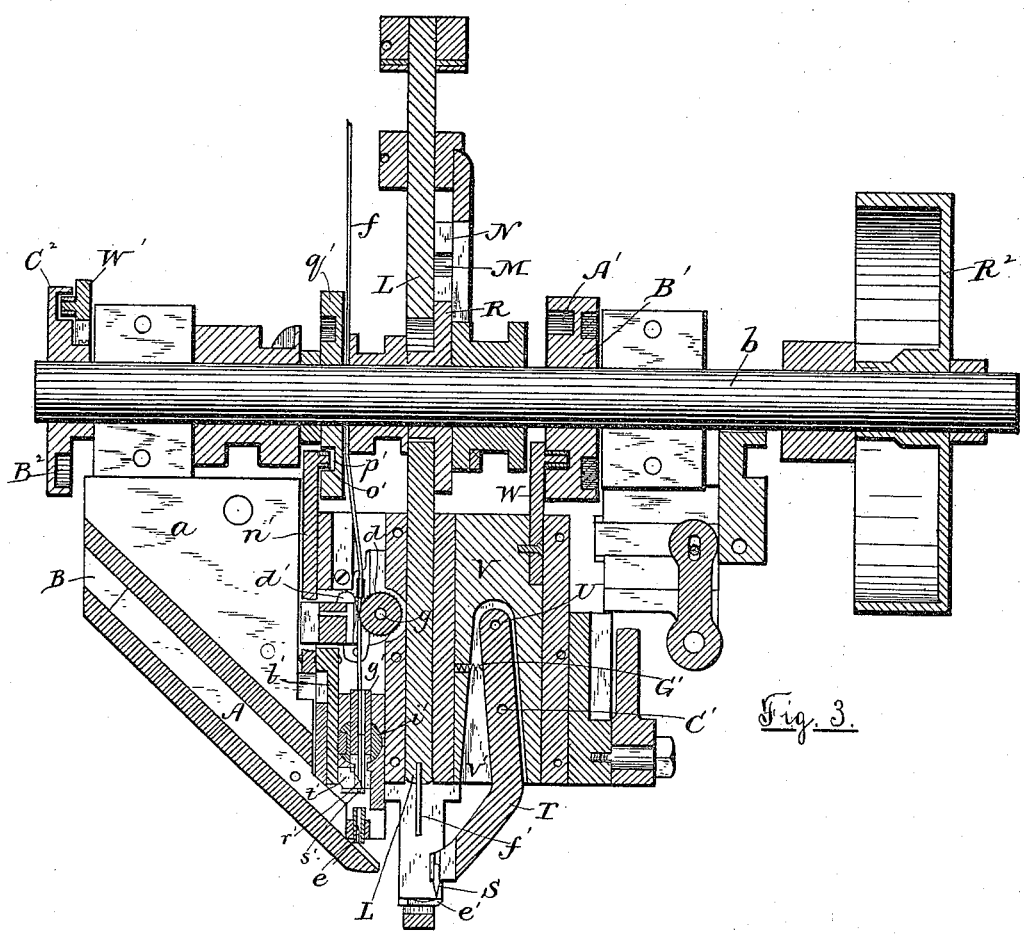
Figure 4:
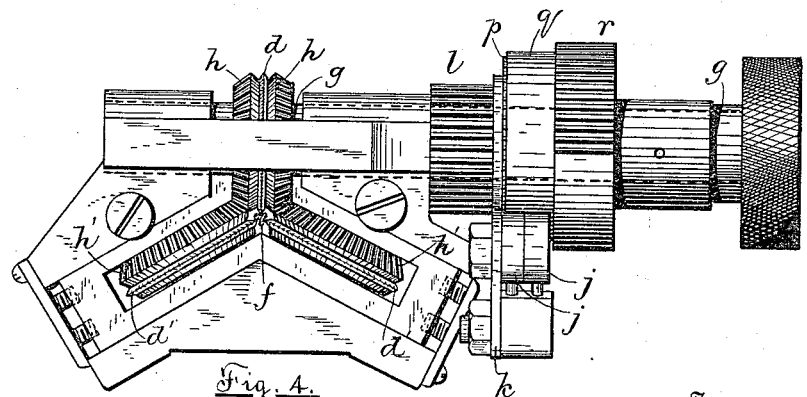

Of the accompanying drawings, forming a part of this specification, Figure 1 represents an end elevation of our improved machine. Fig. 2 represents a front elevation of the same. Fig. 3 represents a section on line $x'$ $x'$, Fig. 1. Fig. 4 represents a top view of the wire-feeding mechanism detached from the machine. Fig. 5 represents a side view of a part of the wire-cutting mechanism, parts thereof being removed. Figs. 6 and 7 represent perspective views of the cutters detached. Fig. 8, (Sheet 1,) represents an end view of a part of the machine, taken from the end opposite that shown in Fig. 1. Fig. 9 represents an enlarged sectional view of the lower end of the driver. Figs. 10 and 11 represent side views of the wire-cutting mechanism, showing the positions of the cutters at different parts of the operation. Fig. 12 represents a front elevation of the nail-carrier and a part of its operating mechanism, one of the levers of said mechanism being shown in section. Fig. 13 represents a section on line $y'$ $y'$, Fig. 12. Fig. 14 represents a section on line $z'$ $z'$, Fig. 1. Fig. 15 represents an enlarged side view and partial section of the nail-carrier.

The same letters of reference indicate the same parts in all the figures.

In the drawings, $a$ represents the head or frame having bearings for the driving-shaft $b$, and mounted on the supporting-standard $c$. The machine is provided with feed-rolls $d$ $d'$ $d'$, which intermittingly feed the wire downwardly into a nail-carrier $e$, whereby the nails are carried into the path of the driver, and with knives, which sever the wire and bevel one side thereof to give the nail a chisel-point. The feed-rolls are three in number, and have acute-angled peripheries, which are arranged, as shown in Fig. 4, to enter the longitudinal grooves formed in the nail-wire $f$, said wire being of the form shown in Patent No. 393,885, above referred to. The feed-roll $d$ is affixed to a shaft $g$, which is rotated intermittingly by means presently described, and on said roll are formed two bevel-gears $h$ $h$, which mesh with corresponding gears $h'$ $h'$ on the other rolls $d'$ $d'$, so that the rolls are rotated in unison. The shaft $g$ is rotated intermittingly by means of pawls $j$ $j$, pivoted to a lever $k$, which is mounted to oscillate loosely on said shaft, and has attached to it a pinion $l$, which is also loosely mounted on the shaft $g$, (the latter serving as a center on which the lever $k$ and pinion $l$ oscillate,) a lever $m$, pivoted at $n$ to the head or frame $a$, and having at one end a gear-segment $m'$, meshing with the pinion $l$, a cam $o$ on the driving-shaft engaged with a trundle-roll on the upper end of the lever $m$, and a ratchet $p$, affixed to the shaft $g$ and having teeth formed to be engaged by the pawls $j$, when the latter are moved in one direction, the pawls slipping over said teeth when moving in the opposite direction. The rotation of the cam $o$ oscillates the lever $m$, and through said lever the pinion $l$ and the lever $k$. Said lever $k$ imparts a back-and-forth motion to the pawls $j$, whereby the latter are caused to intermittingly rotate the feed-roll. The length of wire fed by each feed movement is determined by a movable shield $q$, which is attached to a gear $r$, which is fitted to rotate loosely on the shaft $g$, said shield being arranged to cover a portion of the teeth of the ratchet $p$ and throw the pawls $j$ out of engagement with said ratchet after a part of the forward movement of the pawls has been completed. The gear $r$ meshes with another gear $s$ on a shaft $t$, which is journaled in the head $a$. Said shaft has an arm $u$ affixed to its rear end, (see Fig. 1,) and said arm is connected by a rod $v$ and an arm $w$, Fig. 1, with an arm $x$ affixed to the standard $a'$ that supports the horn $b'$. Said standard is vertically removable, as usual in this class of machines, and is pressed upwardly by a spring $c'$, which causes the horn to hold the bottom of the sole against a fixed rest or throat-plate $e'$ located under the driver $f'$. The thickness of the sole therefore determines the position of the horn, and the latter by the described connection with the shield $q$ determines the extent of movement imparted by the pawls $j$ to the feed-rolls.

$g'$ represents a vertical block, through which the wire passes from the feed-rolls. Said block is attached to a horizontally-movable slide $i'$, which is fitted to move in a socket in a block or holder $a''$ affixed to the head $a$. Said slide has a trundle-roll $j'$, Fig. 5, which enters a cam-groove $k'$, formed in a vertically-reciprocating plate $l'$, said plate being attached to a rod $n'$, Fig. 3, that has a trundle-roll $o'$ at its upper end entering a cam-groove $p'$ in one side of a disk $q'$ on the driving-shaft.

The lower end of the block $g'$ is divided into two sections 2 3, one of which 2 is integral with the block, while the other 3 is pivoted thereto at 4 and constitutes a movable jaw, which is caused to clamp the wire firmly during the cutting operation by devices presently described.

$r'$ $s'$ represent two knives, which are fitted to slide horizontally in ways formed in the holder $a''$. The upper knife $r'$ has an L-shaped cutting-edge, which is formed to remove a wedge-shaped piece from one side of the wire at the point where the latter emerges from the block $g'$, thus forming the beveled side of the nail, and partially severing the wire $f$. The lower knife $s'$ has a cutting-edge $s''$, Fig. 7, which co-operates with the lower end of block $g'$ in completely severing the wire after the upper knife has removed said wedge-shaped piece from the wire. The upper knife $r'$ is attached to a slide or block $t'$, which has a trundle-roll $u'$, and the lower knife is attached to a slide or block $v'$, which has a trundle-roll $w'$, said rolls entering a cam-slot $x'$ in the slide $l'$. The cam-slots $k'$ $x'$ are formed so that when the slide $l'$ is moved downwardly they operate the block $g'$ and knives $r'$ $s'$, as follows: The lower knife $s'$ is first moved toward the wire by the lower portion 6 of the cam-slot $x'$ until its cutting-edge $s''$ bears firmly against the wire, this movement of the knife causing a cam-lever $y'$, which is connected with the lower knife-block $v'$ by a link $z'$, to force the movable section or jaw 3 of the block $g'$ against the wire and firmly hold the same along the portion which is acted on by the cutters. The lower knife is then held at rest by the vertical portion 7 of the slot $x'$, while the portion 8 of said slot moves the upper knife forward across the wire, and causes said knife to cut away the wedge-shaped chip from the wire, after which the portion 9 of the upper cam-slot $k'$ moves the block $g'$ forward or in the same direction as that in which the upper knife is moving, and thus causes the lower end of the block to co-operate with the lower knife $s'$ in severing the wire, the lower end of the block acting as a moving shear-blade and the lower knife as a fixed shear-blade. The severing of the wire completes the nail which drops into the carrier $e$, after which the block $g'$ and the upper knife $r'$ are moved inwardly and the lower knife $s'$ outwardly by the upward movement of the slide $l'$, the knives and block being thus restored to the position shown in Fig. 10, which is the position they occupy before cutting.

The carrier $e$, which is shown in full size and partly in section in Fig. 15, is a vertical tube formed on or attached to the lower end of an inclined slide A, which is movable in an inclined guide B on the head $a$. Said slide is reciprocated by means of a cam C on the driving-shaft, a lever D, pivoted at E to the head $a$ and having at its upper end a trundle-roll engaged with the cam C, and a rod F, connecting the lower end of the lever D with the carrier-slide A. The rotation of the cam C oscillates the lever D and causes it to reciprocate the carrier-slide A. The carrier is thus moved from the point under the knives where it receives the nails to a point under the driver $f'$, and vice versa. Within the carrier is a pivoted tongue G, Fig. 15, which is pressed by a spring H against the nail inserted in the carrier, and holds said nail in the carrier until the nail is ejected by the driver.

The lever D, that communicates motion to the carrier-slide, is preferably made in two sections 12 13, which are mounted independently on the stud or pivot E. The section 12 has arms 12' 12', between which projects a stud 13' on the section 13. Springs 14, contained in sockets in the stud 13', are interposed between said stud and the arms 12'. The object of this construction of the lever D is to give the lower end of said lever a slight yielding movement after the carrier $e$ has reached either extreme of its movement, thus enabling the carrier to be arrested by stops I I', Fig. 12, at the ends of its movements before the lever has quite completed its throw, so that there is no necessity of accurately timing the cam C to stop the carrier in its nail-receiving and nail-delivering positions. The stops I I' are shown in dotted lines in Fig. 12 as screws inserted in lugs J J on the head $a$, and arranged to arrest a stud K, affixed to the carrier-slide A.

L represents the driver-bar, having the driver $f'$ at its lower end and fitted to slide vertically in guides on the head $a$. The driver-bar is connected by a pin or stud M with the free end of a lever N, the other end of which is pivoted at O to a bracket P on the head $a$. To said lever is secured a powerful spring Q, Fig. 1, which gives the driver-bar its nail-driving movement. The driver-bar is raised against the force of said spring by a cam R on the driving-shaft, said cam being formed to first raise and then release the lever N, which bears on the cam.

S represents the work perforating and feeding awl, which is attached to the lower end of a lever T, the opposite end of which is pivoted at U to a slide V, Fig. 3, fitted to move vertically between guides on the head $a$, the said slide having a recess V', which permits the awl-lever to oscillate. The slide V is provided with an arm W, which projects upwardly and has a trundle-roll which enters a cam-groove A' in one side of the disk B' on the driving-shaft. The rotation of said disk reciprocates the slide V vertically, and thus raises and depresses the awl. The awl-lever T is connected by a pin or screw C' with the lower end of a lever D', which is pivoted at E' to the head $a$ and has at its upper end a trundle-roll, which engages a cam F' on the driving-shaft. A spring G', Fig. 3, bearing against the awl-lever T, exerts pressure through the latter on the lever D' and holds the latter engaged with the cam E', the awl-lever being oscillated horizontally by the conjoint action of said spring and cam.

The described vertical and horizontal movements of the awl are so timed that the awl acts as a four-motion feed, it being first depressed and caused to penetrate the sole supported by the horn, then moved horizontally in one direction to feed the work, then raised and withdrawn from the work, and finally moved horizontally back to its starting position. The extent of the feed movement of the awl may be regulated by an adjustable stop-screw J' on the head $a$, which screw arrests the lever D' when the same is being moved backward by the spring G'.

As before stated, the horn is pressed upwardly by the spring $c'$ and holds the boot or shoe sole against the throat or rest $e'$ by the pressure of said spring. To release the sole from said pressure and permit the awl to feed it forward, we provide the following means for depressing the horn.

To the horn-standard $a'$ is attached a vertical arm $x$, Fig. 1, on which is a vertical rack K'. Said rack meshes with a gear-segment L', which is affixed to a shaft M', journaled in bearings on the standard $c$.

To the shaft M' is affixed a disk N', the periphery of which is embraced by a clamp O', which is a piece of elastic metal bent to conform to the periphery of the disk N' and provided at its ends with lugs $O^2$ $O^3$. The lug $O^2$ has an ear $O^4$, Fig. 14, to which is pivoted at $O^5$ a lever $O^6$, having a bearing-screw $O^7$, which bears on the lug $O^3$. The rear end of the lever $O^6$ is connected by a rod $O^8$ with a bell-crank lever $O^9$, which is pivoted at $O^{12}$ to the head $a$, and has at one end an arm $O^{14}$, on which is a trundle-roll engaged with a cam-groove $O^{10}$ in the disk B' on the driving-shaft. When the bell-crank lever $O^9$ is moved by the cam-groove $O^{10}$ in the direction required to raise the rod $O^8$ and the end of the lever $O^6$ connected thereto, the bearing-screw $O^7$ on the lever $O^6$ is depressed upon the lug $O^3$, so that the lugs $O^2$ and $O^3$ are forced toward each other by the movement of the lever $O^6$, said lever being pivoted to an ear attached to the lug $O^2$, as above described. The clamp O' is thus compressed upon the disk N', so that the lever $O^6$ becomes rigidly connected with said disk and is caused to partially rotate the same with the shaft M in the direction required to cause the segment L' on said shaft to depress the horn through the rack K' and arm $x$. When the bell-crank lever $O^9$ is moved in the opposite direction by the cam-groove $O^{10}$, it causes the lever $O^6$ to release the clamp, whereupon the latter expands by its own elasticity and releases the disk N, thus permitting the horn to be pressed upwardly by its spring. It will be seen that the clamp O' and the means for tightening the same upon the disk N' enables the horn to be depressed from any point at which it may stand, so that the downward movement of the horn is the same from a sole of any thickness, the downward movement from a very thick sole being the same as from a thin sole.

To rigidly support the horn while the nail is being driven, we provide a clamp R', composed of a curved strap of metal surrounding the horn-standard $a'$ and on the upper end of the bearing in the post $c$, in which said standard is journaled. The clamp R' has ears $R^2$ $R^3$ at its ends. The ear $R^3$ is internally screw-threaded to receive the threaded end of a shaft S', which is journaled in the lug $R^2$. On said shaft is keyed an arm U', which is connected by a rod V' with a bell-crank lever W', which is pivoted at $A^2$ to the head $a$, and has a trundle-roll engaged with cam-groove $B^2$ in a disk $C^2$ on the driving-shaft. When the lever W' is moved in one direction by the cam-groove $B^2$, it turns the shaft S' through the intermediate devices described, and causes the same, by its screw-thread engagement with the clamp-lug $R^3$, to tighten the clamp R' upon the horn-standard, and thus rigidly hold the horn. When the lever W' is moved in the opposite direction, the clamp R' is loosened, so that the horn is free to rise and fall.

Power is communicated to the driving-shaft by a belt running on a loose pulley $R^4$ on the shaft $b$, a clutch being employed which is moved by the operator by means of a treadle $T^2$ and devices operated by the depression thereof to connect the pulley $R^4$ with the shaft $b$, said clutch being automatically disconnected from the shaft $b$, so that the rotation of the shaft is stopped after each nail is driven. Any suitable clutch and automatic stop-motion may be employed for this purpose.

Operation: The awl being raised and the nail-carrier retracted, as shown in Fig. 2, the operator starts the machine by depressing the treadle $T^2$, and thereby connecting the driving-pulley with the shaft by the clutch device. The awl first descends and enters the work, and before the awl moves laterally to feed the work the horn is depressed to permit the work to feed easily. The awl is then moved laterally by the lever T while depressed, thus feeding the work. After the feed movement the horn is raised and clamps the work against the throat or rest $e'$. The awl then rises and moves back to its starting-point. While the awl is moving backward, the feed-rolls feed the wire into the carrier, which at this period is at its highest position. After the feeding of the wire the cutters sever the wire and form the beveled side thereon. After the cutting of the wire the carrier moves downwardly under the driver, thus placing the nail in the path of the driver. While the carrier is moving downwardly the horn is clamped and held rigidly in its raised position until after the nail is driven. The driver is then released by the cam R and forced downwardly by its spring, thus driving the nail from the carrier into the work. The driver then rises, and at the same time the awl descends to again perforate the work. The carrier rises and returns to its highest position while the awl is moving forward to feed the work. The operation is thus continued, the shaft $b$ being automatically disconnected from the driving-pulley after each nail is driven and connected with said pulley by the depression of the treadle $T^2$ when the operator is ready to drive the next nail.

$T^3$ represents the usual treadle connected to the horn-standard $a'$ to enable the operator to depress the latter.

The driver is provided with an internal cavity $A^3$ at its lower end, (see Fig. 9,) which gives the driver an annular head or acting end, the exterior of the driver being tapered to bring said annular end to a comparatively thin edge. This form of the driver enables it to partially split the head of the nail at the junction of the ribs thereof with the center of the nail, thus enlarging or spreading the head of the nail.

We claim—

1. In a nail-driving machine, the combination, with wire-feeding and nail-driving mechanism, of the wire-holding block $g'$, longitudinally channeled to receive the nail-wire, the upper knife $r'$, formed to cut a notch in the wire held by said block, the lower knife $s'$, adapted to support the wire against the action of the knife $r'$ and to co-operate with the block $g'$ in shearing off or severing the wire, and mechanism for reciprocating said knives $r'$ and $s'$ and for laterally moving the block $g'$, as set forth.

2. In a nail-driving machine, the wire-holding block having the pivoted jaw 3 at its lower end, in combination with means for opening and closing said jaw and a reciprocating knife arranged to cut a wedge-shaped piece from a wire held by said jaw and block, as set forth.

3. In a nail-driving machine, the combination of the block or holder $a''$, the slide $i'$, fitted to move therein, the wire-holding block attached to said slide, the knives $r'$ $s'$ below said slide, the blocks $t'$ $v'$, carrying said knives, the vertically-reciprocating slide $l'$, having cam-grooves $k'$ $x'$, engaged, as described, with the said block and knives.

4. In a nail-driving machine, the combination, with the head or frame $a$ and the wire-cutters and a nail-driver, of a carrier adapted to receive a nail from the cutters, an inclined guide formed in said head for said carrier, and mechanism for reciprocating the carrier in said guide, whereby it is held alternately under the cutters and under the driver, as set forth.

5. The combination, with wire-cutters and a nail-driver, of a carrier adapted to receive a nail from the cutters, an inclined guide for said carrier, the two-part lever having a yielding lower section connected with said carrier, a cam whereby said lever is oscillated, and stops which limit the movements of the carrier, as set forth.

6. The combination of the awl-carrying lever T, the slide V, supporting said lever, means for vertically reciprocating said slide, the lever D', connected with said former lever, and means for oscillating the same, the whole constituting a four-motion-feed mechanism for the awl, as set forth.

7. In a nail-driving machine, the combination of the awl-carrying lever, the vertically-movable slide V, to which said lever is pivoted, the cam A', engaged with said slide, and the cam E', lever D', and spring G', whereby the awl-lever is oscillated, all arranged and operated substantially as described.

8. In a nail-driving machine, the combination, with the horn, of the clamp R, the shaft S', having a screw-thread engagement with one of the lugs of the clamp, the cam $B^2$ on the driving-shaft, and the intermediate devices, whereby the shaft S' is partly rotated by the cam $B^2$, as set forth.

9. In a nail-driving machine, the combination, with the horn, of the shaft M', having a disk, a connection between said shaft and the horn, a friction-clamp on said disk, a clamping-lever $O^6$, pivoted to an ear on one of the lugs of said clamp and bearing on the other lug, a cam $O^{10}$ on the driving-shaft, and the lever $O^9$, engaged with the cam and connected with the clamping-lever, all arranged and operating substantially as described.

In testimony whereof we have signed our names to this specification, in the presence of two subscribing witnesses, this 24th day of September, A. D. 1889.

PATRICK CLIFFORD.
JOSEPH COUPAL.

Witnesses:
  C. F. BROWN,
  A. D. HARRISON.